United States Patent [19]

McMurtry et al.

[11] 4,287,145

[45] Sep. 1, 1981

[54] METHOD FOR MANUFACTURING NEUTRON ABSORBING ARTICLE

[75] Inventors: Carl H. McMurtry, Youngstown; Robert G. Naum, Lewiston; Dean P. Owens; Michael T. Hortman, both of Tonawanda, all of N.Y.

[73] Assignee: Kennecott Corporation, Stamford, Conn.

[21] Appl. No.: 133,182

[22] Filed: Mar. 24, 1980

Related U.S. Application Data

[62] Division of Ser. No. 854,966, Nov. 25, 1977, Pat. No. 4,225,467.

[51] Int. Cl.$^3$ ............................................... B29J 5/00
[52] U.S. Cl. ..................................... 264/109; 264/120
[58] Field of Search .................................. 264/109, 120

[56] References Cited

U.S. PATENT DOCUMENTS

| | | | |
|---|---|---|---|
| 2,796,411 | 6/1957 | Zirkle et al. | 252/78 |
| 2,796,529 | 6/1957 | Morrison | 250/108 |
| 2,928,948 | 3/1960 | Silversher | 250/108 |
| 2,942,116 | 6/1960 | Axelrad | 250/108 |
| 2,961,415 | 11/1960 | Axelrad | 252/478 |
| 3,133,887 | 5/1964 | Alliegro | 252/478 |
| 3,153,636 | 10/1964 | Shanta et al. | 252/478 |
| 3,231,521 | 1/1966 | Sturges et al. | 252/478 |

FOREIGN PATENT DOCUMENTS

| | | |
|---|---|---|
| 1901624 | 8/1970 | Fed. Rep. of Germany . |
| 476372 | 5/1915 | France . |
| 72917 | 5/1976 | Luxembourg . |

*Primary Examiner*—Donald E. Czaja
*Assistant Examiner*—James R. Hall
*Attorney, Agent, or Firm*—Raymond F. Kramer; Paul A. Leipold; Robert C. Weber

[57] ABSTRACT

A neutron absorbing article, preferably in long, thin, flat form, suitable for but not necessarily limited to use in storage racks for spent nuclear fuel at locations between volumes of such stored fuel to absorb neutrons from said spent fuel and prevent uncontrolled nuclear reaction of the spent fuel material, is composed of finely divided boron carbide particles and a solid, irreversibly cured phenolic polymer forming a continuous matrix about the boron carbide particles, in such proportions that at least 6% of $B^{10}$ from the boron carbide content is present therein. The described structures possess a multiplicity of desirable properties for the use mentioned, including withstanding thermal cycling from repeated spent fuel insertions and removals, withstanding radiation from said spent nuclear fuel over long periods of time without losing desirable neutron absorbing and physical properties, being sufficiently chemically inert to water so as to retain neutron absorbing properties if brought into contact with it, not being galvanically corroding and being sufficiently flexible so as to withstand operational basis earthquake and safe shutdown earthquake seismic events without loss of neutron absorbing capability and other desirable properties when installed in storage racks for spent nuclear fuel. In preferred embodiments of the invention the phenolic polymer is a phenol formaldehyde type polymer, such as a trimethylol phenol formaldehyde type polymer, the boron carbide contains at least 12% of $B^{10}$, the plate contains from 8.0 to 11.5% thereof, the plate density is 1.6 to 2.1 g./cc. and the proportions of boron carbide (which may be accompanied by limited amounts of certain impurities) and phenol formaldehyde type polymer (preferably free of halogens, mercury, lead and sulfur) are from 20 to 35% of the former and 65 to 80% of the latter. The invention also relates to a plurality of such neutron absorbing articles in a storage rack for spent nuclear fuel and to a method for the manufacture of the articles. In the manufacturing method a portion of the phenol formaldehyde type resin, in liquid state, is mixed with the boron carbide particles, compacted and cured, after which the cured article is impregnated with additional phenol formaldehyde type resin, which is then cured to make the final product.

12 Claims, 4 Drawing Figures

METHOD FOR MANUFACTURING NEUTRON ABSORBING ARTICLE

This is a division of copending application Ser. No. 854,966, filed Nov. 25, 1977, now U.S. Pat. No. 4,225,467, issued Sept. 30, 1980.

This invention relates to a method for making neutron absorbing articles. More particularly, the invention relates to such a method in which pluralities of resin applications and cures are employed.

Periodically nuclear fuels employed in nuclear reactors to produce power diminish in activity to such an extent that they have to be replaced so that the reactor in which they were employed may operate at specification rate. In the past the spent fuel was temporarily stored in pools of water in which the neutrons and other radiation emitted from the fuel were sufficiently absorbed so as to prevent harm to human life and the environment about the storage facility. Normally, the facility was only temporary and therefore did not have to have a capacity for a very large amount of spent fuel (one or two annual refuelings plus room for a full reactor fuel charge in case of an emergency or complete reactor recharging was usually sufficient capacity) because the spent fuel would be removed from storage periodically for reprocessing or disposal. However, with the moratorium on such reprocessing and the limitations imposed on such disposal operations many utilities have found it necessary to increase the fuel storage capacities of their existing spent fuel pools.

Increasing the capacity of a spent fuel storage pool may be effected in the obvious way, by increasing the size of the pool, but a more efficient and practicable method is to increase the neutron and radiation absorbing ability of the pool itself. Various materials are known to be effective neutron absorbers and of these boron has previously been recognized as exceptionally effective. The $B^{10}$ content of the normally occurring isotopic mixture of $B^{10}$ and $B^{11}$ is the highly effective neutron absorbing component of boron carbide and has a neutron absorbing capability many times that of $B^{11}$. Although boron is metalloidal in character it is not generally suitable for manufacturing sufficiently strong thin articles, such as long thin plates and therefore if it is to be employed as a neutron absorber it is usually in the form of its compounds or alloys. A particularly useful compound, having a large percentage of boron in it, is boron carbide, which is in the form of hard black crystals having a Mohs scale hardness of 9.3 to 9.5, a melting point of about 2,350° C. and a specific gravity of about 2.6.

Boron carbide has previously been fabricated into neutron absorbing articles by various high temperature methods. It also has been formulated with other materials to form neutron absorbers of improved physical properties and such absorbers can often be produced at lower temperatures. Boron carbide in aluminum (boral) has been employed as a useful neutron absorber and it has been suggested that particulate boron carbide be dispersed in polymeric matrices. Thus, U.S. Pat. No. 2,796,411 mentions the use of acrylate resins suitably impregnated or admixed with various boron compounds, including boron carbide, and made into sheets or various other structures. U.S. Pat. No. 2,796,529 describes a shield for radiation which has boron or its compounds included in a laminated structure with synthetic resinous materials such as polytetrafluoroethylene and polyethylene. Also mentioned therein as possible useful polymeric materials are urea formaldehyde, melamine formaldehyde and melamine-urea-formaldehyde synthetic resins. U.S. Pat. No. 2,942,116 mentions neutron shields wherein resins attenuate fast moving neutrons, and boron compounds, such as borax, boric acid and boron carbide, are employed to absorb slow moving neutrons. U.S. Pat. No. 3,133,887 describes boron carbide particles in epoxy resin making a product which is useful as a neutron absorber. Additionally, various other patents refer generally to the employment of resinous materials as bonding agents for neutron absorbers but none appears to be more relevant to the subject matter of the present invention than those already mentioned.

Because of the danger of radiation and the possibility that the spent fuel items, usually in vertical rod form, if stored too close together without effective absorption of slow moving neutrons, could exceed a "critical mass" and/or carry out a highly exothermic nuclear reaction, standards for neutron absorbing articles are extremely high. In addition to being effective absorbers, articles must be shown to be stable under usual storage conditions and resistant to physical shocks, temperature variations, radiation and contact with the aqueous medium in the pool in the event that leakage occurs. Also, resistance to galvanic corrosion, such as in the presence of stainless steel, which is often employed as a container for the absorbing article to keep it separate from the pool medium, is an important quality often required of the neutron absorber. Furthermore, it is not enough for the absorber only to be effective and stable but the absorbing power thereof should be accurately controllable so that desirably effective absorption to a pre-calculated extent is obtained. Finally, it is desirable for the absorbing article to be capable of being made by relatively simple and inexpensive techniques so that the cost of the absorber makes it competitive with similar articles made from boral and other such absorbing compositions.

In accordance with the present invention a shape, curing the phenolic resin of the article at elevated temperature, impregnating the cured article with curable phenolic resin in liquid state and curing said article at elevated temperature. Among the neutron absorbing articles which may be made by the method of the invention are those which comprise boron carbide particles in which the boron carbide content is at least 90%, preferably at least 94%, and which are substantially all of a size to pass through a No. 20 U.S. Sieve Series screen, and a solid, irreversibly cured phenolic polymer cured to a continuous matrix about the boron carbide particles, with the proportion of boron carbide in the structure being such that it contains at least 6%, preferably at least 7% of $B^{10}$ from the boron carbide content thereof. In preferred embodiments of the invention the process is employed to make a neutron absorbing article which is in long, comparatively thin plate form, the boron carbide contains little or no $B_2O_3$ and iron and the phenolic resin of the polymer contains essentially no halogen, mercury, lead and sulfur or compounds thereof. Likewise, the boron carbide and phenolic resin do not come into contact with any halogens, mercury, lead or sulphur or compounds thereof in the fabrication processes.

The invention will be readily understood by reference to the accompanying description thereof in this specification, taken in conjunction with the drawing in which.

Figure 1:
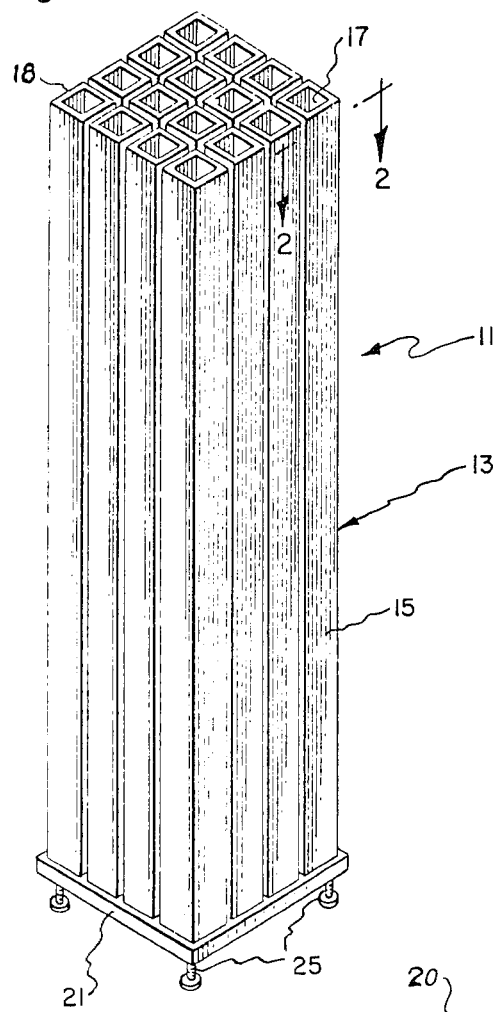
FIG. 1 is a perspective view of a spent fuel storage rack containing a plurality of assemblies for storing spent nuclear fuel.
Figure 2:
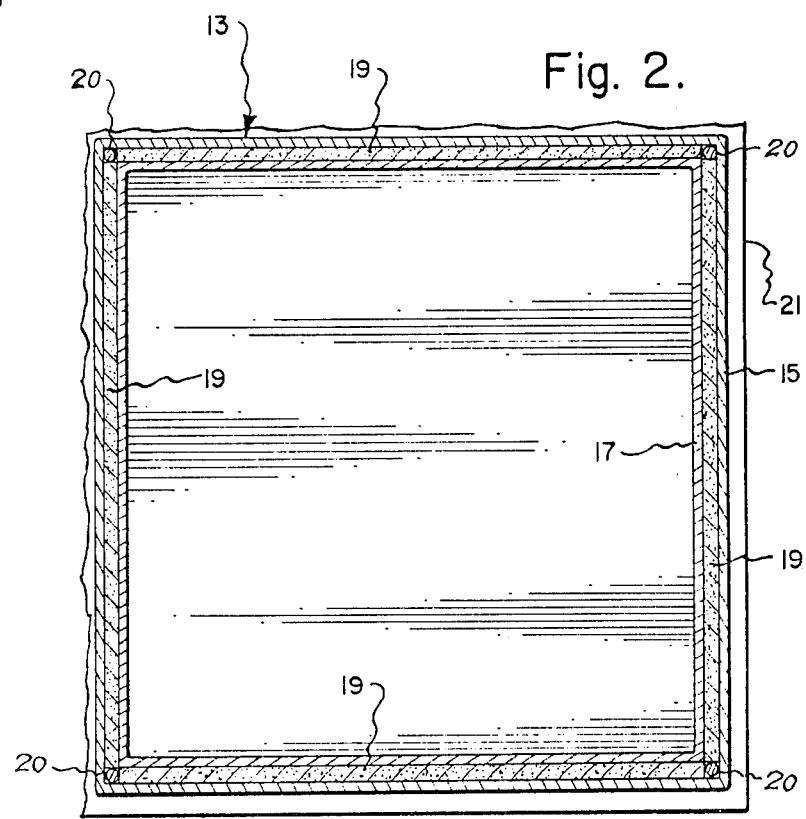
FIG. 2 is a sectional view taken along plane 2—2 of FIG. 1, illustrating the location of neutron absorbing plates in the walls of one of the assemblies of the rack of FIG. 1.

As shown in FIGS. 1 and 2 spent fuel rack 11 includes sixteen assemblies 13, each of which is of essentially square cross section and each of which includes an outer wall 15, an inner wall 17 and intermediate such walls and enclosed between them, tops 18 and bottoms, not illustrated, which are provided to seal off each of the assemblies about the contents, neutron absorbing plates 19. Inside the assemblies of the rack are stored the spent nuclear fuel rods, not illustrated, which extend vertically through the assemblies and have access at the ends thereof to water or aqueous solution in a pool or suitable container, not illustrated, in which the racks are stored. The assemblies of the rack are welded together and are supported on a bottom member 21, mounted on legs 25, which are adjustable in height to permit leveling of the rack.

As is seen in FIG. 2 neutron absorbing plates 19, which are of uniform width, height and thickness, are slid into place between vertical stainless steel rods 20, which are welded to the inner and outer walls 17 and 15, respectively. Usually there is little need to take special steps to prevent escape of radiation through the bottoms of the assemblies and racks but if the aqueous medium in which the racks are stored is insufficient to absorb radiation from the tops thereof additional neutron absorbing articles of this invention, preferably enclosed in stainless steel containers, may be interposed between the racks and the top of the storage container to absorb radiation emissions.

Figure 3:
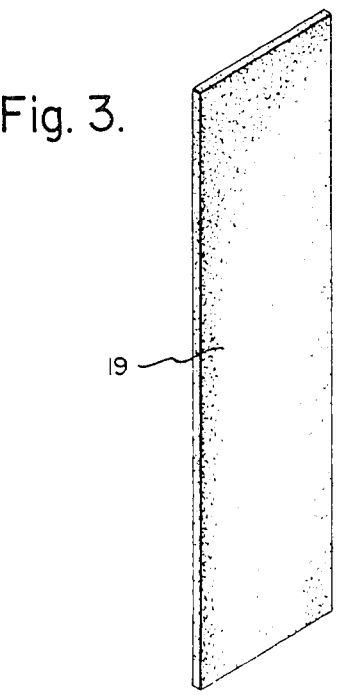
FIG. 3 is a perspective view of a neutron absorbing plate of this invention.

In FIG. 3 is shown a typical neutron absorbing article, in the form of a long thin plate. For example, plate 19 may be of a length of about 93 cm., a width of about 22 cm. and a thickness of about 3 mm. or in some other cases, where greater neutron absorption is required, about 5 mm. In the storage racks of FIGS. 1 and 2, in which the total absorbing height is designed to be about 3.7 meters, walls are of four of the plates illustrated in FIG. 3, positioned one above the other in the stainless steel enclosure (in which the steel is about 3 mm. in thickness). In the plate shown in FIG. 3 the presence of the individual particles of boron carbide will be evident and such can be felt when the plates are handled but such particles are well covered by cured polymer on the major surfaces thereof, such as the faces and at the sides, ends, edges and corners, so that accidental loss of boron carbide particles is inhibited and the neutron absorbing properties of the article are maintained constant at a design level.

Figure 4:
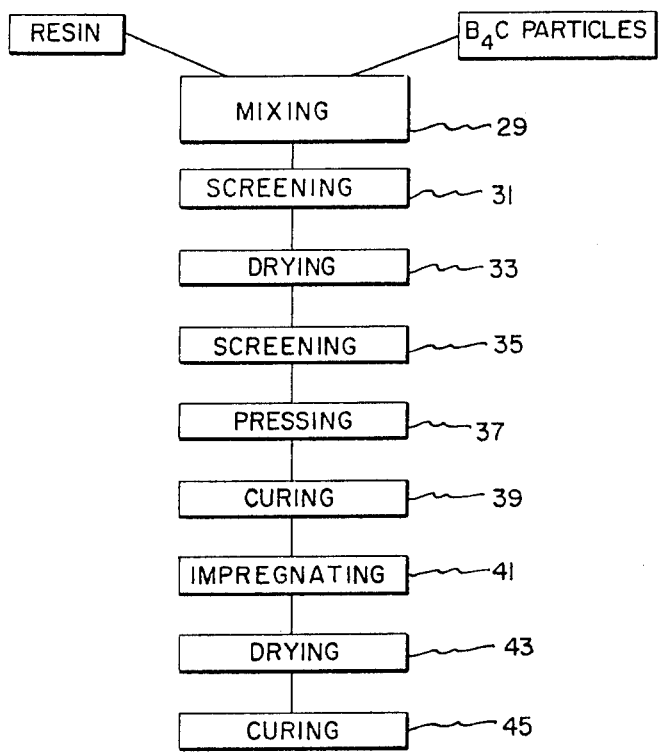
FIG. 4 is a diagrammatic representation of a process for the manufacture of the neutron absorbing articles of this invention.

In the diagrammatic illustration of FIG. 4 is shown a preferred method for the manufacture of the present neutron absorber. Initially, mixing, represented at 29, is effected in a paddle mixer type of apparatus wherein weighed quantities of boron carbide powder and phenolic resin, in normally liquid state, are thoroughly mixed together to make a boron carbide-resin mix lower in resin content than the polymer content of the final article but still curable to a form-retaining intermediate. After mixing is completed the product is screened at 31 (to break up any lumps and otherwise to increase product uniformity) into drying trays to a desired thickness and in drying operation 33 is allowed to dry to a desired extent, preferably in a controlled environment, so that it is desirably "tacky" for molding, yet not too fluid. Preferably such drying is effected at about room temperature, e.g., 10°–35° C., preferably 20° to 25° C., and at normal relative humidities, e.g., 10 to 75%, preferably 35 to 65%, but other conditions can also be used to produce the same result. Next, it is screened in operation(s) 35 and is passed through a finer screen into a mold in which the correct weight of charge is pressed (37) under high pressure for a short period of time. After pressing, the mold is unloaded and the pressed "green" article is cured, as represented by numeral 39, in a forced air oven at an elevated temperature, in a curing cycle which comparatively slowly increases the temperature to the desired elevated level, maintains it at such level and gradually lowers it. Next in impregnating operation 41 the cured plates are placed in an impregnating tank where they are kept separated from each other, the tank is sealed and a vacuum is drawn on it, after which additional resin in liquid state is drawn into the tank by means of the vacuum and is allowed to cover and impregnate each plate. The resin is then forced from the tank by air pressure, the tank is opened and the basket of impregnated plates is removed. The plates are removed from the basket, placed on their sides on drying racks, separated from each other, and are dried at elevated temperature in operation 43, following which they are further cured at a higher temperature in operation 45, again with a controlled heating cycle. The products made are of desired density, uniformity of neutron absorbing capability, flexibility and other required and desired physical properties, look like that of FIG. 3 and are capable of being incorporated in any of various types of storage racks for spent nuclear fuel, such as are illustrated in FIGS. 1 and 2.

An important advantage of the neutron absorbing article of this invention is that it contains a high proportion of boron carbide particles, such that at least 6% of the article is $B^{10}$, preferably at least 8% and mpore preferably 8 or 8.5 to 11.5%, usually most preferably 9 to 11%. Thus, relatively thin walled sections of the article, such as those of thicknesses from about 2 mm. to 1 cm., are effective neutron absorbers. Additionally, due to the uniformity of distribution of the boron carbide particles in the phenolic polymer matrix the neutron absorbing capability of the articles made may be calculated, enabling engineers to design storage racks to a high degree of precision, thereby allowing planned effective loading of a storage rack for spent nuclear fuel when the present neutron absorbing articles are a part thereof.

In addition to being primarily effective as a neutron absorber the present absorbing article is operable over a temperature range at which the spent nuclear fuel is normally stored in storage racks, withstands thermal cyclings from repeated spent fuel insertions and removals, withstands radiation from the spent nuclear fuel over long periods of time without losing desirable neutron absorbing and physical properties, is sufficiently chemically inert in water or aqueous medium in which the spent fuel is stored so as to retain effective neutron absorbing properties in the event that a leak occurs which allows the entry of water into the enclosure for the neutron absorbing article in the storage rack and into contact with such articles, does not galvanically corrode and is sufficiently flexible so as to withstand operational basis earthquake and safe shutdown earthquake seismic events without losing neutron absorbing capability and other desirable physical properties when installed in a storage rack. While boron compounds and boron carbide in particular have been employed in some applications as neutron absorbers and while it has been suggested that various polymeric materials may be used as binders for particles of boron compounds, such as boron carbide, it is not considered that prior art absorbers were as effective and as stable during use as those of this invention, especially when the articles of this invention are made by the method described herein. Also, the high level of product consistency with design specifications provides a much needed and previously lacking technical validity for such products.

The boron carbide employed should be in finely divided particulate form. This is important for several reasons, among which are the production of effective bonds to the phenolic polymer cured about the particles, the production of a continuous coating of polymer over the boron carbide particles at the article surface and the obtaining of a uniformly distributed boron carbide content in the polymeric matrix. It has been found that the particle sizes of the boron carbide should be such that substantially all of it (over 90%, preferably over 95%, more preferably over 99% and most preferably over 99.9%) or all passes through a No. 20 (more preferably No. 35) screen. Preferably, substantially all of such particles, at least 90%, more preferably at least 95% pass through a No. 60 U.S. Sieve Series screen and at least 50% pass through a No. 120 U.S. Sieve Series screen. Although there is no essential lower limit on the particle sizes (effective diameters) usually it will be desirable from a processing viewpoint and to avoid objectionable dusting during manufacture for no more than 25% and preferably less than 15% of the particles to pass through a No. 325 U.S. Sieve Series screen and normally no more than 50% thereof should pass through a No. 200 U.S. Sieve Series screen, preferably less than 40%.

In addition to boron carbide particle size being of importance in the making of successful neutron absorbers of the present type it is highly desirable that the boron carbide be essentially $B_4C$. While the present inventors are aware that work at their assignee company has shown that materials such as silicon carbide can be partially substituted for boron carbide in neutron absorbers of lower desired absorbing activity without deterioration of the physical properties of the article made, to obtain the high absorption characteristics of the present products, which are often required for satisfactory spent fuel storage, it is considered important that the content of such compatible non-absorbing "fillers," such as silicon carbide, should be kept limited and most of the time it should be nil.

Boron carbide often contains impurities, of which iron, (including iron compounds) and $B_2O_3$ (or impurities which can readily decompose to $B_2O_3$ on heating) are among the more common. Both of such materials, especially $B_2O_3$, have been found to have deleterious effects on the present products and therefore contents thereof are desirably limited therein. For example, although as much as 3% of iron (metallic or salt) may be tolerable in the boron carbide particles of the present high boron carbide content absorbers, preferably the iron content is held to 2%, more preferably to 1% and most preferably is less than 0.5%. Similarly, to obtain stable absorbing articles, especially in long, thin plate form, it is important to limit the $B_2O_3$ content (including boric acid, etc., as $B_2O_3$), usually to no more than 2%, preferably less than 1%, more preferably less than 0.5% and most preferably less than 0.2%. Of course, the lower the iron and $B_2O_3$ contents the better.

The boron carbide particles utilized will usually contain the normal ratio of $B^{10}$ but may also contain more than such proportion to make even more effective neutron absorbers. Of course, it is also possible to use boron carbide with a lower than normal percentage of $B^{10}$ (the normal percentage being about 18.3%, weight basis, of the boron present) but such products are rarely encountered and are less advantageous with respect to neutron absorbing activities.

Other than the mentioned impurities normally boron carbide particles should not contain other components than boron carbide (nominally $B_4C$) in significant amounts. Thus, at least 90% of the boron carbide particles should be boron carbide, preferably at least 94% and more preferably at least 97%, and the $B^{10}$ content thereof (from the boron carbide) will be at least 12%, preferably at least 14% (14.3% $B^{10}$ in pure $B_4C$). To maintain the stability of the boron carbide-phenolic polymer article made it is considered to be important to severely limit the contents of halogen, mercury, lead and sulfur and compounds thereof, such as halides, and so, of course, these materials, sometimes found present in impure phenolic resins, solvents, fillers and plasticizers, will be omitted from those and will also be omitted from the composition of the boron carbide particles to the extent this is feasible. At the most, such particles will contain no more of such materials than would result in the final product just meeting the upper limits thereof, which will be mentioned in more detail in the following discussion with respect to the phenolic polymer and the resin from which it is made.

The solid, irreversibly cured phenolic polymer, cured to a continuous matrix about the boron carbide particles in the neutron absorbing articles, is one which is made from a phenolic resin. The phenolic resins constitute a class of well-known thermosetting resins. Those most useful in the practice of the present invention are condensation products of phenolic compounds and aldehydes, of which phenolic compounds phenols and lower alkyl- and hydroxy-lower alkyl substituted phenols are preferred. Thus, the lower alkyl substituted phenols may be of 1 to 3 substituents on the benzene ring, usually in ortho and/or para positions, and the alkyls are of 1 to 3 carbon atoms, preferably methyl, and the hydroxy-lower alkyls present will similarly be 1 to 3 in number and of 1 to 3 carbon atoms each. Mixed lower alkyls and hydroxy-lower alkyls may also be employed but the total of substituent groups, not counting the phenolic hydroxyl, is preferably no more than 3. Although it is possible to make a useful product with the phenol of the phenol aldehyde resin being essentially all substituted phenol usually it is preferred to have some phenol present therein e.g., 5 to 15%. For ease of expression the terms "phenolic type resins," "phenol-aldehyde type resins" and "phenol-formaldehyde type resins" may be employed in this specification to denote broadly the acceptable types of materials described which have properties equivalent to or similar to those of phenol-formaldehyde resins and trimethylol phenol formaldehyde resin when employed to produce thermosetting polymers in conjunction with boron carbide particles, as described herein.

Specific examples of useful "phenols" which may be employed in the practice of this invention, other than phenol, include cresol, xylenol and mesitol and the hydroxy-lower alkyl compounds preferred include mono-, di- and tri-methylol phenols, preferably with the substitutions at the positions previously mentioned. Of course, ethyl and ethylol substitution instead of methyl and methylol substitution and mixed substitutions wherein the lower alkyls are both ethyl and methyl, the alkylols are both methylol and ethylol and wherein the alkyl and alkylol substituents are also mixed are also useful. In short, with the guidance of this specification and the teaching herein that the presently preferred phenols are phenol and trimethylol phenol, other compounds such as those previously described may also be utilized providing that the effects obtained are similarly acceptable. This also applies to the selection of the aldehydes and sources of aldehyde moiety employed but generally the only aldehyde utilized will be formaldehyde (compounds which decompose to produce formaldehyde may be substituted).

The phenolic or phenol formaldehyde type resins are usually employed as either resols or novolaks. The former are generally called one-stage or single-stage resins and the latter are two-stage resins. The major difference is that the single-stage resins include sufficient aldehyde moieties in the partially polymerized lower molecular weight resin to completely cure the hydroxyls of the phenol to a cross-linked and thermoset polymer upon application of sufficient heat for a sufficient curing time. The two-stage resins or novolaks are initially partially polymerized to a low molecular weight resin without sufficient aldehyde present for irreversible cross-linking so that a source of aldehyde, such as hexamethylenetetramine, has to be added to them in order for a complete cure to be obtained by subsequent heating. Either type of resin may be employed to make phenolic polymers such as those described herein but it is much preferred to employ the single-stage resins, especially because there is no need to vent any ammonia or other gaseous byproducts of the decomposition of the hexamethylenetetramine source of formaldehyde normally employed with the two-stage resins.

The resin employed will be low molecular weight, usually being the dimer, trimer or tetramer. Generally the molecular weight of the resin will be in the range of 200 to 1,000, preferably 250 to 750 and most preferably 250 to 500. The resin will usually be employed as an aqueous, alcoholic or other solvent solution so as to facilitate "wetting" of the boron carbide particles. While water solutions are preferred lower alkanolic solutions such as methanol, ethanol and isopropanol solutions or aqueous alkanolic solutions or dispersions are also usable. Generally the resin content of the liquid state resin preparation employed will be from 50 to 90%, preferably about 55 to 85%. The solvent content, usually principally water, may be from 5 to 30%, usually being from 7 to 20%, e.g., 8%, 10%, 15%, with the balance of liquid components normally including aldehyde, phenolic compound and often, liquid monomer. Thus, for example, in a liquid unmodified phenolic resin of the single-stage type based principally on the condensation product of trimethylolphenol and formaldehyde, there may be present about 81% of dimer, about 4% of monomer, about 2% of trimethylol phenol, about 4% of formaldehyde and about 8% of water. When two-stage resins are employed the curing agent will also be included with the resin, in sufficient quantity to completely cure (cross-link) it. Such quantity can be 0.02 to 0.2 part per part of resin. To avoid ammonia production during curing a sufficient quantity of an aqueous solution of aldehyde or another suitable source thereof which does not release ammonia may be used for curing novolaks.

The resins employed are in the liquid state desirably, usually because of the low molecular weight of the condensation products which are the main components thereof but also sometimes due to the presence of liquid media, such as water, other solvents and other liquids which may be present. Generally the viscosity of such resins at 25° C. will be in the range of 200 to 700 centipoises, preferably 200 to 500 centipoises. Usually the resin will have a comparatively high water tolerance, generally being from 200 to 2,000 or more percent and preferably will have a water tolerance of at least 300%, e.g., at least 1,000%. Among the useful products that may be employed are Arotap 352-W-70 (most preferred); Arotap 352-W-71; Arotap 8082-Me-56; Arotap PB-90; Arofene 536-E-56; and Arofene 72155, all manufactured by Ashland Chemical Company, and phenolic resins B-178; R3; and R3A, all manufactured by The carborundum Company. All such resins will be modified when desirable to omit halides, especially chloride, halogen, mercury, lead and sulfur and compounds thereof or to reduce proportions thereof present to acceptable limits. In some cases the procedure for manufacture of the resin will be changed accordingly. Although the mentioned resins are preferred a variety of other equivalent phenolic type resins, especially phenolformaldehydes, of other manufacturers and of other types may also be employed providing that they satisfy the requirements for making the molded neutron absorbing articles set forth in this specification. Among such requirements, for successful use of the articles made in spent fuel storage racks the resins should contain only very limited amounts, if any at all, of halide or halogen, mercury, lead and sulfur, all of which are considered to be harmful to the function and stability of the neutron absorber when employed in a spent fuel storage rack. Additionally $B_2O_3$ interferes with curing, causing the "green" molded item to lose its shape during the cure. Generally, less than 0.1% of each of such impurities (except the $B_2O_3$) are in the final article, preferably less than 0.01% and most preferably less than 0.005%, and resin contents thereof are limited accordingly, e.g., to 0.4% preferably 0.04%, etc. To assure the absence of such impurities the phenol and aldehyde employed will initially be free of them, at least to such an extent as to result in less than the limiting quantities recited, and the catalysts, tools and equipment employed in the manufacture of the resins will be free of them, too. To obtain such desired results the tools and materials will preferably be made of stainless steel or aluminum or similarly effective non-adulterating material.

The proportions of boron carbide particles and irreversibly cured phenol formaldehyde type polymer in the neutron absorbing article will normally be about 60 to 80% of the former and 20 to 40% of the latter, preferably with no other impurities, such as water, solvent, filler, plasticizer, halide or halogen, mercury, lead and sulfur being present or if any of such is present, the amount thereof will be limited as previously described and otherwise held to no more than 5% total. Preferably, the respective proportions will be 65 to 80% and 20 to 35%, with presently most preferred proportions being about 70% and 30% or 74% and 26%, and with essentially no other components in the neutron absorber. Within the proportions described the production made has the desirable physical characteristics for use in storage racks for spent nuclear fuel, which characteristics will be detailed later. Also, the described ratios of boron carbide particles and phenolic resin permit manufacture by the simple, inexpensive, yet effective method of this invention.

To manufacture the neutron absorbers, such as those in thin plate form, there are first mixed together a portion of the curable phenolic resin in liquid state and all of the boron carbide particles. The proportion of resin employed at this stage, preferably having a molecular weight in the preferred range previously mentioned, will usually be 1/5 to ½, preferably ¼ to 2/5 of the total resin used, e.g., ⅓. Thus, for example, from about 80 to 100 parts, preferably 85 to 95 parts, e.g., 89 parts, of boron carbide particles may be mixed with about 7 to about 15 parts, preferably 7 to 12 parts, e.g., 10 parts of resin, with the resin being accompanied by about 0.3 to about 1.4 or 2 parts, e.g., about 0.8 part of water or aqueous medium, although solvents, such as previously mentioned, may also be present. Additionally, there may be included with the resin other reactants and byproducts of the process for the manufacture thereof.

Mixing is effected in a paddle mixer or other suitable heavy duty mixer capable of dispersing the boron carbide particles in the comparatively thick resin. Mixing times will usually be in the range of ten minutes to two hours, preferably from 20 to 40 minutes. After completion of this operation the mixture is screened, preferably through a coarse screen, such as one of about 2 to 5, mesh and screening is into drying trays to a depth of about 0.5 to 1.5 cm. The mix is allowed to dry on such trays at about room temperature, 15° to 30° C., usually 20° to 25° C., for a period of about 8 to 24 hours, preferably about 12 to 20 hours, at normal humidity, e.g., 35 to 65% relative humidity, so as to permit the evaporation of a significant proportion, preferably 10 to 90% of the moisture, solvent and readily volatile materials present. Any lumps formed during such drying are removed by screening, usually through a 5 to 20 mesh screen, preferably through an 8 to 12 mesh screen. Of course, during the entire manufacturing procedure materials employed will be such that they will not give up objectionable impurities to the mix. Thus, normally, stainless steel and aluminum will be the materials that come into contact with the mix, the articles made and intermediate products.

Next the desired pre-calculated weight of grain-resin mixture is screened into a clean mold cavity of desired shape through a screen of 2 to 10 mesh size openings, preferably having 4 to 8 mesh openings, and is leveled in the mold cavity by sequentially running across the major surface thereof a plurality of graduated strikers. This gently compacts the material in the mold, while leveling it, thereby distributing the boron carbide and resin evenly throughout the mold so that when such mix is compressed it will be of uniform density and $B^{10}$ concentration throughout. A sheet of glazed paper is placed on top of the leveled charge and atop this there are placed a top setter plate and a top plunger, after which the mold is inserted in a hydraulic press and is pressed at a pressure of about 20 to 150 kg./sq. cm., preferably 35 to 110 kg./sq. cm., for a period of about 1 to 30 seconds, preferably 2 to 5 seconds. After removal of the mold from the molding press setter plates on both sides of the pressed mixture, together with the pressed mixture, are removed from the mold cavity, the top setter plate is removed and the release paper is stripped from the pressed mixture, leaving it supported by the bottom setter plate. Such combination, together with a plurality of other such combinations from other moldings, is next inserted in a curing oven, preferably by being placed in spaced relationship with other such combinations on an oven cart that is then wheeled into a comparatively large oven.

The initial cure, preferably effected in a forced air oven, is carried out in stages, in the earlier parts of which remaining volatile materials are evaporated off without damage to the article structure. This initial curing is effected at a temperature in the range of 130° to 200° C., preferably 140° to 160° C., over a period of about 2 to 10 hours, preferably about 4 hours, and normally the curing temperature is gradually attained, preferably over a period of 1 to 6 hours, more preferably over 2 to 4 hours, at a substantially uniform rate of temperature rise, and a similar cool-down period is employed. Normally, the total cycle will be from 5 to 15 hours, preferably 8 to 12 hours, e.g., 10 hours. After cooling of the cured articles to about room temperature they are ready for impregnation with liquid state resin and curing to final product condition.

In one impregnation method the cured articles, usually in thin plate form, are held vertically, separated from each other, as by a wire or openwork separator, placed in an impregnating tank or structure, subjected to vacuum, resin impregnated and cured. The use of vacuum is highly desirable to promote the removal of any gas from the article and to aid replacement of it with resin, which increases the strength of the absorber. However, when previous operations have been carried out successfully and in accordance with the instructions given the use of vacuum may often be obviated (because comparatively little excessive air will be present in the molded article). When vacuum is employed it is desirable that it be a comparatively high vacuum, such as from 500 to 750 mm. of Hg, preferably from 600 to 700 mm. Hg. Normally it will take from two minutes to an hour to draw a satisfactory vacuum on the impregnating tank, usually about ten to thirty minutes. The vacuum will preferably be drawn in the absence of any resin so that the surfaces of the initially cured article will be free to permit withdrawal of any gases therein or at least to permit lowering of the pressure of such gases. After the vacuum is drawn it may be held for an additional period of time, e.g., 1 to 5 minutes. The vacuum may be utilized to draw liquid state resin, preferably but not necessarily of the same composition as that initially employed, into the tank, wherein it is allowed to cover each of the plates. Addition of the resin to the tank by means of the vacuum may take from 1 to 20 minutes and after all of the plates are covered the liquid state resin may be left in the tank for an additional 1 to 10 minutes, preferably 1 to 5 minutes. The excess resin is then removed from the molded articles, preferably by a combination of gravity and air pressure, such as a pressure of 0.2 to 5 kg./sq. cm. gauge The add-on of resin after such draining of the excess resin-aqueous resin mixture will be about 10 to 40 parts, preferably about 15 to 35 parts, e.g., about 28 or 31 parts, so that the final absorber article made will contain about 60 to 80% of boron carbide and 20 to 40% of irreversibly cured phenol formaldehyde type polymer, preferably 65 to 80% and 20 to 35% and most preferably about 70% and 30% or 74% and 26%, respectively. The phenolic resin in liquid state, which comprises the add-on, may be accompanied by 0.3 to 5 parts of liquid, preferably aqueous medium, with such medium usually being 5 to 20% of the resin, preferably 7 to 15% thereof.

The plates containing add-on phenolic resin are removed from the baskets or other containers in which they have been positioned in the impregnating vessel and are placed on drying racks so that the major surfaces thereof, when flat, stand vertical. The plates are suitably separated from each other to allow air circulation, as by wires. Drying is effected at an elevated temperature to remove water, solvent and volatiles which may be present. The drying temperature is usually in the range of 40° to 60° C., preferably about 50° C. and the time of drying is from 10 to 100 hours, preferably 24 to 96 hours. After drying, the absorber articles are cured at an elevated temperature, usually 130° to 200° C., preferably 140° to 160° C., over a period of about 2 to 10 hours, preferably with gradual heating over a 4 to 10 hour heat-up cycle and gradual cooling over a 3 to 8 hour cooling cycle, with the total time in the oven being 8 to 24 hours. Preferably, the heating cycle is about 16 hours, with a 7-hour heat-up cycle, a 4-hour hold at 140° to 160° C. and a 5-hour cooling cycle. Although it is not necessary in carrying out the preferred processes of this invention, pressure may be applied on the articles being cured so as to help to prevent any bleeding of resin and so as to maintain the resin evenly distributed throughout the absorber plate. Such pressure is gas pressure, not compressing or press pressure such as the 20 to 150 kg./sq. cm. compacting pressure employed earlier, and usually the gas pressure, if used, will be about 5 to 10 kg./sq. cm. No compressing or press pressure is employed in either the initial or final cure, thereby simplifying the process, avoiding the use of complex equipment and allowing the simultaneous curings of large numbers of absorber plates. In the final cure it is highly preferable to position the dry, impregnated but not finally cured absorber plates on horizontal setter plates, often with fiberglass cloth or equivalent separators between such setter plates and the absorbers. By stacking the absorber-setter plate sets 3 to 10 high, with such separators preventing plate-setter contacts and facilitating ready removals of the absorbers from the setter plates, good cures of undistorted plates are obtained without excessive bleeding of resin, etc. and the plates made are flat (but use of separators is not usually required).

Although the neutron absorbing articles made may be of various shapes, such as arcs, cylinders, tubes (including cylinders and tubes of rectangular cross-section), normally they are preferably made in comparatively thin, flat plates, which may be long plates or which may be used a plurality at a time, preferably erected end to end, to obtain the neutron absorbing properties of a longer plate. Generally, to obtain adequately high neutron absorbing capability the articles will be from 0.2 to 1 cm. thick and plates thereof will have a width which is 10 to 100 times the thickness and a length which is 20 to 500 times such thickness. Preferably, the width will be from 30 to 80 times the thickness and the length will be 100 to 400 times that thickness.

The neutron absorbing articles made in accordance with this invention are of a desirable density, normally within the range of about 1.2 g./cc. to about 2.3 g./cc., preferably 1.6 to 2.1 g./cc., e.g., 1.8 g./cc. They are of satisfactory resistance to degradation due to temperature and due to changes in temperature. They withstand radiation from spent nuclear fuel over exceptionally long periods of time without losing their desirable properties. They are designed to be sufficiently chemically inert in water so that a spent fuel storage rack in which they are utilized could continue to operate without untoward incident in the event that water leaked into their stainless steel container. They do not galvanically corrode in the presence of stainless steel and aluminum and are flexible enough to withstand seismic events of the types previously mentioned. Thus, they have a modulus of rupture (flexural) which is at least 100 kg./sq. cm. at room temperature, 38° C. and 149° C., a crush strength which is at least 750 kg./sq. cm. at 38° C. and 149° C., a modulus of elasticity which is less than $3 \times 10^5$ kg./sq. cm. at 38° C. and a coefficient of thermal expansion at 66° C. which is less than $1.5 \times 10^{-5}$ cm./cm. °C.

The absorbing articles made, when employed in a storage rack for spent fuel, as in an arrangement like that shown in FIG'S. 1-3, with fuel rods stored on centers of squares which are from 15 to 40 cm. apart, is designed to give excellent absorption of slow moving neutrons, prevent creation of a critical mass and active or runaway nuclear reactions and allow an increase in storage capacity of a conventional pool for spent fuel storage up to over 500%. The designed system is one wherein the aqueous medium of the pool is water at an acidic or neutral pH or is an aqueous solution of a boron compound, such as an aqueous solution of boric acid or buffered boric acid, which is in contact with the spent fuel rods although such rods are maintained out of contact with the present boron carbide-phenolic polymer neutron absorber plates. In other words, although the spent fuel is submerged in a pool of water or suitable aqueous medium and although the neutron absorber plates are designed to surround it they are normally intended to be protected by a suitably constructed enclosure from contact with both the pool medium and the spent fuel.

The absorber plates made in accordance with this invention by the method described above are subjected to stringent tests to make sure they possess the desired resistances to radiation, galvanic corrosion, temperature changes and physical shocks, as from seismic events. Because canisters in which they may be utilized might leak they also should be inert or substantially inert to long term exposure to storage pool water, which, for example, could have a pH in the range of about 4 to 6, a chloride ion concentration of up to 0.15 part per million, a fluoride ion concentration of up to 0.1 p.p.m., a total suspended solids concentration of up to 1 p.p.m. and a boric acid content in the range of 0 to 2,000 p.p.m. of boron. Also, the "poison plates" of this invention should be capable of operating at normal pool temperatures, which may be about 27° to 93° C., and even in the event of a leak in the canister should be able to operate in such temperature range for relatively long periods of time, which could be up to six months or sometimes, a year. Further the product should be able to withstand $2 \times 10^{11}$ rads total radiation and should not be galvanically corroded in use nor should it cause such corrosion of metals or alloys employed. In this respect, while normally ordinary 304 or 316 stainless steel may be used for structural members when seismic events are not contemplated, where such must be taken into consideration in the design of storage racks utilizing the present absorbers, high strength stainless steels will preferably be used. The present absorbers are designed so as not to be galvanically corroded and not to promote galvanic corrosion.

The advantages of the present invention over prior methods for manufacturing neutron absorbers are many but principally they reduce to the manufacturing method being simple, efficient and economical and resulting in the production of a physically stable, chemically stable and radiation-resistant neutron absorber of high and uniform neutron absorbing capacity, which may be employed to significantly increase the storage capacity for both pressurized water reactor and boiling water reactor nuclear fuels, which normally are in the form of rods. The absorbers made by the method of the invention may also be of greater lengths than prior products, e.g., 0.8 to 1.2 meters, so fewer joints between plates result. Of course, in addition to the absorbers made by this invention being used in stationary spent fuel storage racks they may also be employed in racks or other containers or mechanisms in which nuclear material is being used, stored, transported or manufactured. Thus, the articles made by this invention have a more general utility than for employment only in nuclear fuel storage racks of the types described.

The following examples illustrate but do not limit the invention. In the examples and in this specification all parts are by weight and all temperatures are in °C., unless otherwise indicated.

EXAMPLE 1

183.2 Kilograms (kg.) of boron carbide powder and 20.6 kg. of Ashland Chemical Co. Arotap Resin 358-W-70 are mixed in a paddle mixer at room temperature (25° C.) for thirty minutes to produce a homogeneous mixture in which the resin appears to be substantially uniformly distributed over the surfaces of the particles. The boron carbide powder is one which has been previously washed with hot water and/or appropriate other solvents, e.g., methanol, ethanol, to reduce the boric oxide and any boric acid content thereof to less than 0.5% (actually 0.16%) of boric oxide and/or boric acid, as boric oxide. The powder analyzes 75.5% of boron and 97.5% of boron plus carbon (from the boron carbide) and the isotopic analysis is 18.3 weight percent $B^{10}$ and 81.7% $B^{11}$. The boron carbide particles contain less than 2% of iron (actually 1.13%) and less than 0.05% each of halogen, mercury, lead and sulfur. The particle size distribution is 0% on a 35 mesh sieve, 0.4% on 60 mesh, 41.3% on 120 mesh and 58.3% through 120 mesh, with less than 15% through 325 mesh. The Arotap resin solution, a thick liquid, having a viscosity of 200 to 500 centipoises at 25° C. and a water tolerance of about 1,000%, is principally a condensation product of trimethylolphenol and formaldehyde and contains about 82% of dimer, about 4% of monomer, about 2% of trimethylolphenol, about 4% of formaldehyde and about 8% of water. The resin contains less than 0.01% of each of halogen, mercury, lead and sulfur, including compounds thereof.

After completion of mixing, which is effected in a suitable stainless steel or aluminum paddle mixer, the mix is screened through a 3 mesh sieve into drying trays to a thickness of 1.3 cm. The tray dimensions are approximately 1.2 meter×1.2 meter, with the bottom being composition board and the sides being hardwood or pine painted over with a protective coating. The mix is allowed to dry in the drying trays for sixteen hours at room temperature (15° to 30° C.) and at normal humidity (35 to 65%). The loss in weight is about 50-70% of the moisture content, e.g., about 6.0% of the weight of "resin" added or about 0.6% of the mix. The mix is next screened through a 10 mesh screen and is ready for use.

The molds employed comprise four sides of case hardened steel (brake die steel) pinned and tapped at all four corners to form an enclosure, identical top and bottom plungers about 2.5 cm. thick made of T-61 aluminum and 1.2 cm. thick flat top and bottom aluminum tool and jig setter plates. The molds, which had been used previously, are prepared by cleaning of the inside surfaces thereof and insertions of the bottom plunger and the bottom setter plate on top of the plunger. A weighed charge (1450 grams) of the mix is then hand screened through a 5 mesh stainless steel screen and is leveled in the mold cavity with a series of graduated strikers, the dimensions of which are such that they are capable of leveling from about a 23 mm. thickness to the desired 20 mm. final mixture thickness, with steps about every 0.8 mm. A special effort is made to make sure to fill the mold at the ends thereof so as to maintain uniformity of boron carbide distribution throughout. Thus, the strikers are initially pushed toward the ends and then moved toward the more central parts of the molds and they are employed sequentially so that each strike further levels the mix in the mold. A piece of glazed paper is then placed on top of the leveled charge, glazed side down and the top setter plate and top plunger, both of aluminum, are inserted. The mold is then placed in a hydraulic press and the powder-resin mix is pressed to a stop at 5.3 mm. thickness of the molded composition therein. The size of the "green" plate made is about 21 cm. by 85 cm. by 5.4 mm. The pressure employed is about 107 kg./sq. cm. and it is held for three seconds. The pressure may be varied so long as the desired initial "green" article thickness and density are obtained. After completion of pressing the mold is removed from the press and at an unloading station a ram and a fixture force the plungers, setter plates and pressed mixture upwardly and through the mold cavity. The top plunger and top setter plate are then removed and the pressed mixture is movable intact with the bottom setter plate. The release paper is stripped from the pressed mixture and the bottom setter plate plus the pressed mixture are placed flat on an oven cart with other such combinations in spaced apart positions, for wheeling into an oven in which the pressed mixtures are cured.

The initial cure of the pressed mix is effected by increasing the temperature gradually by about 40° C. per hour from room temperature to 149° C. over a period of about three hours, holding for four hours at 149° C. and then cooling at a rate of about 40° C./hr. for three hours, back to room temperature. The total cycle is about ten hours and is automatically controlled. At the end of the curing cycle (the initial cure) the pressed plates can be easily removed from the setter plates and are independently form retaining. When weighed it is noted that they have lost additional weight, often losing an average of 40 grams each, e.g., to 1387 grams each.

Such weight corresponds to a density of about 1.5 g./cc. and in view of the density of boron carbide particles (about 2.3 to 2.6 g./cc.) and the cured resin (about 1.3 g./cc.) it is evident that despite the use of high pressure pressing and the compacting of the charge by the press the plate is somewhat porous. The plates made are subject to a quality control check of the uniformity of the thickness thereof and any significant variation therefrom, for example, outside the 5.1 to 5.6 mm. range, may be cause for rejection. The quality control check may be made after pressing but before initial curing, when desired, or checks at both points may be utilized.

After completion of the initial cure, the pressed plates, removed from the setter plates, are positioned vertically in a basket, 50 plates per unit, standing on ends therein and separated by wires or screening and the basket is installed in an impregnating vessel, which includes connections to a source of vacuum, pressurized air and liquid resin. The stainless steel vessel is then sealed and a vacuum of about 660 mm. of mercury is drawn on the tank over a period of about five minutes, after which the valve to the resin supply is opened and liquid resin is drawn into the tank and allowed to completely cover all of the plates therein. Such addition of resin takes place over a period of about 1 to 5 minutes, after which the connection to the vacuum source is closed and the plates, submerged in the liquid resin, are allowed to absorb such resin over a period of 1 to 5 minutes. Then, the resin is forced from the tank by compressed air at a pressure of about 260 mm. Hg gauge. The vessel is then opened and the basket containing the impregnated plates is removed therefrom. The plates are taken out of the baskets, placed on their thin sides on drying racks separated by lengths of stainless steel or aluminum wire or clips and are dried at 52° C. for a period of about 60 hours. During this drying operation there is a weight loss of about 1/12 of the approximately thirty additional percent of liquid state phenolic resin impregnating the plates (about 1.9% of the plates). The resin add-on is about 3/5 to 3/4 of the total resin content.

The dried impregnated plates are next placed on setter plates of the type previously described, form-retaining flat aluminum with fiberglass cloth separators covering the impregnated plates, and are stacked six high, flat sides up and down, on carts, which are then placed in a pressurizable oven, which is sealed and pressurized to about 6.4 kg./sq. cm. gauge. The temperature in the pressurized oven is raised to 149° C. gradually over a seven hour period with one hour holds at 79° C., 93° C. and 121° C. After holding for four hours at 149° C. the temperature is gradually decreased to room temperature over a period of five hours, dropping at about 26° C. per hour. Thus, the total pressurized curing cycle takes sixteen hours, after which the cured plates are removed from the carts and are inspected.

The finished plates are of about 70% boron carbide particles and 30% phenolic polymer, of a length of 84.8 cm., a width of 21.0 cm. and a thickness of 5.4 mm., like the measurements previously given. However, the weight is 1.754 kg. and the density is 1.82 g./cc. The plates analyze 54.8% of boron, corresponding to 70.8% of boron carbide (boron+carbon) and also to 10.0% of $B^{10}$. They have a modulus of rupture (flexural) of at least 100 kg./sq. cm. (actually 484 kg./sq. cm. at room temperature) at 25° C., 38° C. and 149° C., a crush strength of at least 750 kg./sq. cm. at 38° C. and 149° C., a modulus of elasticity less than $3 \times 10^5$ kg./sq. cm. (actually $1.75 \times 10^5$ kg./sq. cm. at 25° C.) at 38° C. and a coefficient of thermal expansion at 66° C. which is less than $1.5 \times 10^{-5}$ cm./cm. °C.

EXAMPLE 2

Following the method described in Example 1, 125 kg. of boron carbide powder and 15.5 kg. of Arotap Resin 358-W-70 are admixed. The boron carbide powder, like that of Example 1, is low in $B_2O_3$ content, containing 0.17% thereof. The powder analyzes 71.7% of boron and 97.4% of boron+carbon (from the boron carbide) and the isotopic analysis is 18.3% $B^{10}$ and 81.7% $B^{11}$. The boron carbide particles contain 0.8% of iron and less than 0.05% each of halogen, mercury, lead and sulfur, including compounds thereof. The particle size distribution is 0% on a 35 mesh sieve, 0.9% on a 60 mesh sieve, 42.2% on a 120 mesh sieve and 56.9% through a 120 mesh sieve, with less than 40% through a 200 mesh sieve and less than 15% through a 325 mesh sieve.

The charge of the boron carbide-resin mix weighed out and added to each mold is 950 grams and the size of the green plate made is about 14.9 cm. by 79.2 cm. by 5.33 mm. No fiberglass separators are employed in final curing. The finished plates are of about 63% of boron carbide particles and 37% of phenolic polymer and of the dimensions previously given herein. The weight of the absorber plate is 1.17 kg. and the density thereof is 1.86 g./cc. The plates analyze 48.3% of boron, corresponding to 61.7% of boron carbide and 8.8% of $B^{10}$. They have a modulus of rupture (flexural) of 381 kg./sq. cm. at room temperature and over 100 kg./sq. cm. at 38° C. and 149° C., a crush strength of at least 750 kg./sq. cm. at 38° C. and 149° C., a modulus of elasticity of $1.1 \times 10^5$ kg./sq. cm. at room temperature and less than $3 \times 10^5$ kg./sq. cm. at 38° C. and a coefficient of thermal expansion at 66° C. which is less than $1.5 \times 10^{-5}$ cm./cm. °C.

EXAMPLE 3

The procedures of Examples 1 and 2 are repeated, utilizing a boron carbide powder containing 79.1 weight percent of boron and 98.5% of boron plus carbon (from the boron carbide). The weights of boron carbide particles and resin employed are 159 kg. and 19.7 kg., respectively and the boron carbide particles contain 0.07% of iron, less than 0.05% each of halogen, mercury, lead and sulfur and 0.1% of boric oxide and/or boric acid, as boric oxide ($B_2O_3$). The particle size distribution of the boron carbide particles is 0.1% on 35 mesh (No. 35 screen), 3.4% on 60 mesh, 32.8% on 120 mesh, and 63.7% through 120 mesh, with less than 20% and preferably less than 15% through 325 mesh. The compacted charge made is about 79 cm. long by 14.9 cm. wide by 5.4 mm. thick and weighs about 985 g. before curing and 963 g. thereafter. The final product, after impregnation and final curing, measures 79 cm. by 14.9 cm. by 5.4 mm. and weighs 1170 grams. The density thereof is 1.84 g./cc. It includes 57.9% of boron, 72% of boron carbide, 73.2% of boron carbide particles (the 1.2% difference being largely inerts) and 10.7% of $B^{10}$. The modulus of rupture (flexural) is at least 100 kg./sq. cm. at room temperature, 38° C. and 149° C. (actually 517 kg./sq. cm. at room temperature), the crush strength is at least 750 kg./sq. cm. at 38° C. and 149° C., the modulus of elasticity is less than $3 \times 10^5$ kg./sq. cm. at 38° C., being $1.6 \times 10^5$ kg./sq. cm. at room temperature and the coefficient of thermal expansion at 66° C. is less than 1.5×10$^{-5}$ cm./cm. °C.

The neutron absorbing plates made are of satisfactory resistance to degradation due to temperature and changes in temperature encountered in normal uses as neutron absorbers. They are designed to withstand radiation from spent nuclear fuel over long periods of time without losing desirable properties and similarly are designed to be sufficiently chemically inert in water so that a spent fuel storage rack could continue to operate without untoward incident in the event that water should leak into a stainless steel container in such a rack in which they are contained. They do not galvanically corrode and are sufficiently flexible, when installed in a spent nuclear fuel rack, to survive seismic events of the types previously mentioned.

When installed in a rack for storage of spent nuclear fuel, such as one of a type generally illustrated in FIGS. 1 and 2, with the spent fuel being that from either a pressurized water reactor or a boiling water reactor, immersed in water or an aqueous solution of boric acid, with the plates of this invention being stacked to a sufficient height to contain the spent fuel, e.g., 4 to 5 high on a side of a square about the spent nuclear fuel and inside a hermetically sealed stainless steel chamber, the plates are effective neutron absorbers and allow for significant increases in storage capacity of conventional pools for storing spent nuclear fuel, e.g., 100% to over 500% capacity increase.

In variations of this process the resin may be replaced with a phenol formaldehyde resin of similar viscosity and polymerizable resin content (even two-step resins may be used), the boron carbide particles may be replaced by such particles containing less than 0.1% of $B_2O_3$ and variations in the manufacturing procedure within the limitations described in the specification may be employed. The product resulting will be a useful neutron absorbing plate. Similarly, instead of pressing into plate form other shapes may be made. Different proportions of resin and boron carbide particles may be utilized within the ranges described and the product made may be of different densities within the ranges given, e.g., 1.6 g./cc. and 2.0 g./cc. When absorbing plates are to be manufactured the dimensions may be varied and in addition to the plate sizes mentioned earlier in this specification they may also be produced in a variety of other dimensions, e.g., 23 cm. by 81 cm. by 3, 4, 5, or 6 mm. Of course, products of other dimensions may also be made as desired, with the length, width and height, if plates are made, being within the ranges previously given.

Changes in the manufacturing procedure may be effected providing that the proportions of liquid state resin and boron carbide particles are such as will make workable mixtures capable of holding together satisfactorily after pressing to green plate shape so as to be curable to such shape on a setter plate. In this respect, evaporation of moisture, solvents and other materials which could cause fluidizing of the green plate will be controlled so that such plate will maintain its structural integrity during the initial cure, especially as the uncured resin is being heated and is thereby being decreased in viscosity before being cured. Although it is not as important to control fluidity of the resin during the normal room temperature impregnation of the initially cured plates the use of vacuum prior to impregnation is desirable, as is the employment of pressure thereafter to aid in the discharge of the resin from the impregnating vessel. Similarly, pressure applied during the curing cycle tends to prevent leaking of the resin from the plate as the resin is thinned by heating but it is contemplated that the present plates may be made without the use of vacuum and pressure in the impregnating vessel and without the employment of pressure in curing the impregnated articles. Different liquid state resins may be utilized for the impregnation step than those initially mixed with the powdered boron carbide. Of course, various other changes may be made in proportions of components, types thereof, temperatures, pressures, times and various treatments within the description of this invention and useful neutron absorbers will result.

The two-step process utilized allows the manufacture of an absorbing article of uniform neutron absorbing power without the need for complex equipment, high temperature and high pressure pressing operations designed to cure the resin in the mold, and allows quick and economical production of the absorbing articles. Particularly, it is important that the pressing of the resin-boron carbide particle mix into green plates or articles be a fast operation because such articles can be made quickly and then large numbers of them can be cured, impregnated and finally cured together. If the desired final bonding proportion of liquid state resin of the types described, such as Arotap 358-W-70, is mixed with boron carbide particles initially the result is too fluid a mix, which does not form satisfactorily form-retaining green plates and which, on curing, tends to have the resin bleed from the plate. Thus, use of the two-step process results in a product which is capable of being manufactured rapidly and to specifications, utilizing simple, efficient and essentially trouble free equipment and processes. The irreversibly cured thermosetting resins of this invention, whether resols or novolaks are employed, result in form-retaining stable structures considered to be superior to various other synthetic organic polymeric plastics, in uses under the testing conditions in which racks for the storage of spent nuclear fuel are operated.

The invention has been described with respect to various illustrations and embodiments thereof but is not to be limited to these because it is evident that one of skill in the art with the present specification before him will be able to utilize substitutes and equivalents without departing from the spirit of the invention.

What is claimed is:

1. A method for manufacturing a neutron absorbing article which comprises mixing together a curable phenolic resin with boron carbide particles, compacting the mixture to an article of desired shape, curing the phenolic resin of the article at elevated temperature, impregnating the cured article with curable phenolic resin in liquid state and curing said article at elevated temperature.

2. A method according to claim 1 wherein the boron carbide content of the boron carbide particles is at least 90% by weight, the particles are substantially all of a size to pass through a No. 20 U.S. Sieve Series screen and the neutron absorbing article made contains at least 6% of $B^{10}$.

3. A method according to claim 2 wherein the boron carbide content of the boron carbide particles is at least 94%, the neutron absorbing article made contains at least 7% of $B^{10}$ from the boron carbide content thereof and the resin mixed with the boron carbide particles is a liquid state resin.

4. A method according to claim 3 wherein, after mixing the boron carbide particles and the phenolic resin, moisture and/or solvent contents, if present, are reduced prior to compacting the mixture to a form-retaining article of desired shape, after impregnating the cured article with phenolic resin in liquid state moisture and/or solvent contents, if present, are reduced before curing and the neutron absorbing article produced is operable in storage racks for spent nuclear fuel over a temperature range at which the spent nuclear fuel is stored, withstands thermal cycling from repeated spent fuel insertions and removals and withstands radiation from said spent nuclear fuel for long periods of time without losing desirable neutron absorbing and physical properties, is sufficiently chemically inert in water so as to retain neutron absorbing properties in the event of a leak allowing the entry of water into an enclosure for the neutron absorbing article in a storage rack for spent nuclear fuel and into contact with it, does not galvanically corrode and is sufficiently flexible so as to withstand operational basis earthquake and safe shutdown earthquake seismic events without loss of neutron absorbing capability and other desirable physical properties when installed in such a storage rack.

5. A method according to claim 4 wherein the neutron absorbing article made is a plate, the boron carbide particles are substantially all of a size to pass through a No. 35 U.S. Sieve Series screen, they contain at least 12% of $B^{10}$, proportions of boron carbide particles and phenolic resin initially mixed are from 80 to 100 parts of boron carbide particles and 7 to 15 parts of resin, the resin is accompanied by 0.3 to 2 parts of aqueous medium, the mixture of boron carbide, phenolic resin and aqueous medium is screened to convert any agglomerates thereof to substantially uniform size, dried, screened, compacted to plate shape of desired thickness and density, cured at elevated temperature while not under compacting pressure, impregnated with 10 to 40 parts of phenolic resin in liquid state, which resin is accompanied by 0.3 to 5 parts of aqueous medium, dried and cured at a higher elevated temperature while not under compacting pressure to produce a plate of a density in the range of 1.2 to 2.3 g./cc., containing at least 8% of $B^{10}$, 60 to 80% of boron carbide particles and 20 to 40% of irreversibly cured phenolic polymer.

6. A method according to claim 5 wherein the neutron absorbing article made is a long plate of uniform thickness, at least 90% of the boron carbide particles pass through a No. 60 U.S. Sieve Series screen and at least 50% of such particles pass through a No. 120 U.S. Sieve Series screen, the proportions of boron carbide particles and phenolic resin initially mixed are from 85 to 95 parts of boron carbide particles and from 7 to 12 parts of resin, the resin is accompanied by 0.3 to 1.4 parts of aqueous medium, the dried and screened mixture of boron carbide particles, resin and aqueous medium is screened into a mold and leveled to desired volume and weight by leveling with a plurality of graduated strikers, compacting is effected by application of a pressure of about 20 to 150 kg./sq. cm. for a period of 1 to 30 seconds, curing is effected at a temperature in the range of 130° to 200° C. over a period of from 2 to 10 hours, the impregnated plates are drained of excess resin-aqueous medium mixture, are dried at a temperature of 40° to 60° C. for from 24 to 96 hours and are cured for from 2 to 10 hours at a temperature of 130 to 200° C. to produce a plate of a density in the range of 1.6 to 2.1 g./cc. containing from 8.5 to 11.5% of $B^{10}$, 65 to 80% of boron carbide particles and 20 to 35% of phenol formaldehyde type polymer.

7. A method according to claim 6 wherein the neutron absorbing plate made contains only boron carbide particles containing no more than 2% of iron and no more than 0.5% of $B_2O_3$, the phenol formaldehyde polymer thereof is a trimethylol phenol formaldehyde polymer free of halogens, lead, mercury, sulfur, filler, plasticizer and solvent therewith, at least 95% of the boron carbide particles pass through a No. 60 U.S. Sieve Series screen and at least 50% of such particles pass through a No. 120 U.S. Sieve Series screen, the proportions of boron carbide particles and phenolic resin initially mixed are about 89 parts of boron carbide particles and about 10 parts of resin, compacting is effected by application of a pressure of about 35 to 110 kg./sq. cm. for a period of about 2 to 5 seconds, curing is effected at a temperature in the range of 140° to 160° C. over a period of about four hours, vacuum is applied to the cured article before impregnation thereof by the resin-aqueous medium mixture, the amount of such mixture applied and subsequently cured is such that the add-on of polymer is from 3/5 to ¾ of that ultimately cured with the boron carbide particles and the final curing is at a temperature of 140° to 160° C., to produce a plate in which the thickness is from 0.2 to 1 cm., the width is from 10 to 100 times the thickness and the length is from 20 to 500 times the thickness, the modulus of rupture (flexural) is at least 100 kg./sq. cm. at room temperature, 38° C. and 149° C., the crush strength is at least 750 k./sq. cm. at 38° C. and 149° C., the modulus of elasticity is less than $3 \times 10^5$ kg./sq. cm. and the coefficient of thermal expansion at 66° C. is less than $1.5 \times 10^{-5}$ cm./cm. °C.

8. A method according to claim 7 wherein before screening and compacting the mixture of boron carbide particles and phenol formaldehyde type polymer is dried at a temperature of about 15° to 30° C. and a relative humidity of about 35 to 65% for from 8 to 24 hours so as to evaporate from 10 to 90% of moisture, solvent and readily volatile materials present and produce a screenable and compactable mix which is form retaining on a setter plate after comprising for 2 to 5 seconds at a pressure of 35 to 110 kg./sq. cm.

9. A method according to claim 3 wherein after mixing together the curable phenolic resin in liquid state with boron carbide particles the mixture is dried at a temperature of about 15° to 30° C. and a relative humidity of about 10 to 75% so as to evaporate 10 to 90% of moisture, solvent and readily volatile materials present and produce a screenable and compactable mix which is form retaining on a setter plate after compacting for 2 to 5 seconds at a pressure of 35 to 110 kg./sq. cm.

10. A method according to claim 1 wherein after compacting the mixture to a form-retaining article of desired shape such article is cured at elevated temperature while being supported by a setter plate.

11. A method according to claim 8 wherein curing of the article after impregnation with a curable phenolic resin in liquid state is effected at elevated temperature with a plurality of curable articles, each supported on horizontal setter plates stacked vertically so as to produce undistorted cured plates.

12. A method according to claim 1 wherein before mixing with the curable phenolic resin the boron carbide particles are washed with water or other suitable solvent for soluble boron compounds so that such particles will contain no more than 2% of $B_2O_3$ and/or other soluble boron compound, as $B_2O_3$.

* * * * *